July 14, 1942.   J. G. KINSEY   2,290,055
APPARATUS FOR VARYING THE DEPTH OF BEER ON THE PLATES OF A STILL
Filed May 21, 1940

INVENTOR
Jacob G. Kinsey
BY
Herbert S. Fairbanks
ATTORNEY

Patented July 14, 1942

2,290,055

UNITED STATES PATENT OFFICE 2,290,055

APPARATUS FOR VARYING THE DEPTH OF BEER ON THE PLATES OF STILLS

Jacob G. Kinsey, Philadelphia, Pa.

Application May 21, 1940, Serial No. 336,352

4 Claims. (Cl. 261—110)

The object of this invention is to devise a novel apparatus for varying the body of a distilled liquor by varying the depth of beer on the plates of the still.

By increasing the depth of beer on the plates a more vigorous boiling of the beer is obtained and a higher flavor in the distilled spirits.

By decreasing the depth of beer on the plates a less vigorous boiling of the beer is obtained and less flavor.

A further object of the invention is to materially reduce the cost of rectification.

With the above and other objects in view as will hereinafter clearly appear, my invention comprehends a novel apparatus for varying the depth of beer on the plates of a still.

Other novel features of construction and advantage will hereinafter more clearly appear in the detailed description and the appended claims.

For the purpose of illustrating the invention, I have shown in the accompanying drawing a typical embodiment of it, which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Similar numerals indicate corresponding parts.

Referring to the drawing—

Figure 1:
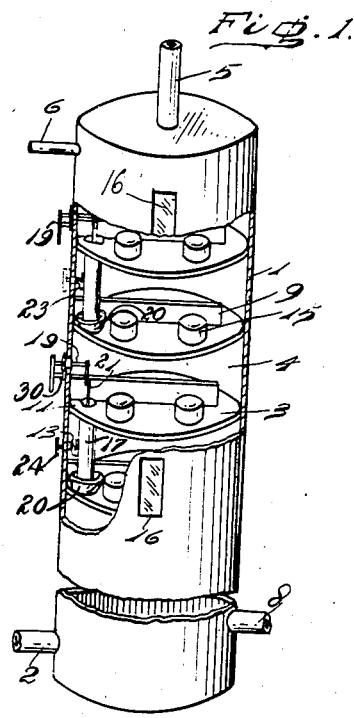
Figure 1 is a perspective view, partly in section, of a still, in conjunction with which means are employed embodying my invention for varying the depth of beer on the plates.

1 designates the casing of a still having a steam coil 2 at its bottom for heating the slop, and superimposed plates or heads 3 which contribute with the casing to form chambers 4. The upper end of the casing 1 has an outlet 5 leading to a conventional condenser such as is well known in this art.

The heated beer is fed into the upper end of the still through beer inlet 6 in the conventional manner.

The slop is discharged from the still by outlet 8 and subsequently treated in the conventional manner.

The plates 3 if the still is circular are in the form of discs secured in any desired manner to the wall of the casing 1.

Each plate has a baffle 9 rising from its top face and extending from one side wall of the casing to terminate a desired distance from the opposite side wall of the casing to direct the flow of beer over the plate. The baffles are arranged so that the direction of flow on one plate is reversed to the direction of flow on the next plate. Each plate is provided with novel means for regulating the depth of the beer.

Each plate 3 has an opening 10 in which is mounted a discharge tube 17.

Each plate has boiler caps 15 which are conventional.

Each chamber 4 has an observation window 16 so that the operation in each chamber is visible to the operator.

Figure 2:
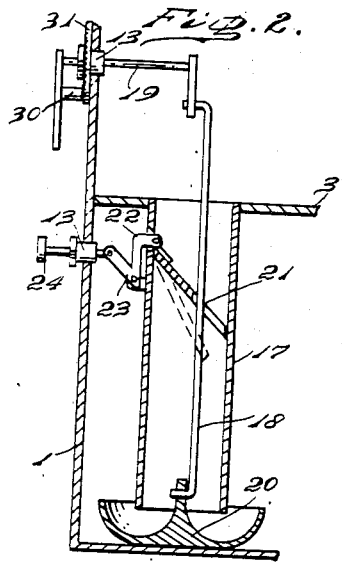
Figure 2 is a sectional elevation, on an enlarged scale, of depth control means shown in Figure 1.

In Figure 2, I have shown means for regulating the depth of beer on a plate. A pipe 17 opens at its top through a plate and extends downwardly to terminate a desired distance from the plate beneath it. A manually controlled rod 18 is connected with a hand crank 19.

The rod 18 is connected at its lower end to a bowl shaped member 20. By raising or lowering the member 20, the flow of beer through the down pipe 17 can be regulated and thereby regulate the depth of beer on the plate.

In some cases, it is advantageous to employ a valve 21 pivoted at 22 and having a lever 23 connected with a handle 24.

The operation will now be apparent to those skilled in this art and is as follows:

The heated beer in the usual manner is fed to the beer inlet 6 and flows through the depth controlling tubes from one chamber to another until it reaches the slop chamber at the bottom of the still.

The alcoholic vapors passing upwardly through the chambers, plates, and beer cause the proper diffusion of such vapors and beer, with proper agitation during the boiling operation.

I preferably produce the alcoholic vapors by the action of steam pipes sumberged at all times during the operation in the slop in the slop chamber at the bottom of the still.

I have shown an embodiment which may be advantageously employed to regulate the depth of beer on the plates.

The seal at the bottom of a tube provides proper clearance for the flow of beer and prevents vapor which would interfere with the downward flow from ascending through the tube.

Any desired means may be employed for locking the actuating handles in the adjusted positions of the tubes or valves, and, in order to illustrate one manner of accomplishing this result, I have shown the handles as provided with spring pressed plungers 30 which lock into indentations in washers 31, spot welded or otherwise fixed to the casing of the still.

When member 20 is adjusted in position, the spring pressed plunger for such assembly will lock it in the position to which it has been adjusted to maintain a selected depth of beer on its plate.

My present invention is of special advantage, since it enables one to make the same amount of recovery in about one third of the time and with a saving of about one third in steam consumption.

Having thus described my invention, what I claim as new and desire to secure by Letters Patent is:

1. In a still, a casing having superimposed plates contributing to form superimposed chambers, means to introduce beer into the upper portion of said casing, means to withdraw slop from said casing, open ended tubes extending through the plates and having bowl shaped members at their discharge ends, operable exteriorly of and journalled in said casing, and connected with said members to raise or lower said members to form vapor seals, and means to control the flow through said tubes and thereby the depth of beer on the plates.

2. In a still, a casing having superimposed plates contributing to form superimposed chambers, open ended pipes opening through and depending from said plates, sealing members at the bottoms of said pipes having chambers open at their tops and into which the pipes extend, and hand cranks operable exteriorly of and journalled in said casing and connected with said sealing members to raise or lower said sealing members to vary the depth of beer on the plates.

3. In a still, a casing having superimposed plates contributing to form superimposed chambers, open ended tubes depending from said plates and forming communication between said chambers, sealing means at the discharge ends of said tubes, and valves within said tubes and adjustable exteriorly of the casing to control the flow through said tubes to control the depth of beer on the plates.

4. In a still, a casing having spaced chamber forming plates, pipes opening through and depending from said plates, sealing members having chambers open at the top and into which said pipes discharge, hand cranks connected with said members to raise or lower them, and journalled in the casing to be operable exteriorly of the casing, and valves in said pipes and controllable outside of the casing.

JACOB G. KINSEY.